United States Patent [19]
Nishihara et al.

[11] Patent Number: 5,450,440
[45] Date of Patent: Sep. 12, 1995

[54] MONITOR SYSTEM FOR DIGITAL COMMUNICATION APPARATUS

[75] Inventors: Motoo Nishihara; Takatoshi Kurano, both of Tokyo; Kenji Akutsu; Hiromi Ueda, both of Kanagawa, all of Japan

[73] Assignee: NEC Corporation, Tokyo, Japan

[21] Appl. No.: 964,135

[22] Filed: Oct. 22, 1992

[30] Foreign Application Priority Data

Oct. 23, 1991 [JP] Japan .................................. 3-304237

[51] Int. Cl.⁶ ...................... H04B 3/46; H04B 17/00; H04Q 1/20
[52] U.S. Cl. .................... 375/224; 375/213; 370/13.1; 455/9
[58] Field of Search ...................... 375/3.1, 10; 370/13, 370/13.1; 455/9, 10, 14, 16, 67.1, 67.4

[56] References Cited

U.S. PATENT DOCUMENTS

| | | | |
|---|---|---|---|
| 4,653,070 | 3/1987 | Nakajima et al. | 375/3.1 X |
| 5,038,364 | 8/1991 | Motoori | 370/13.1 X |
| 5,068,879 | 11/1991 | Woodroffe | 375/115 |
| 5,095,482 | 3/1992 | Grallert | 375/3.1 X |

OTHER PUBLICATIONS

Newell, J. C., "High speed pseudo-random binary sequence generation for testing & data scrambling in gigabit optical transmission systems", IEE Colloquium on 'Gigabit Logic Circuits', No. 75, pp. 1–4.

Kanayama, Y. et al., "Virtual path management functions for broad-band ATM networks", IEEE Global Telecommunications Conf., pp. 1401–1405, vol. 2.

Primary Examiner—Stephen Chin
Assistant Examiner—Bryan E. Webster
Attorney, Agent, or Firm—Foley & Lardner

[57] ABSTRACT

In a monitor system in a digital communication apparatus including communication processing blocks on transmission paths of digital data, test data inserting units and data monitor units are arranged such that a monitor interval for the monitor operation in a block overlaps with a monitor period for the monitor operation between adjacent blocks in each processing block. As a result, there is no unmonitored interval in each processing block, thereby achieving a complete monitor operation.

14 Claims, 11 Drawing Sheets

MONITOR SYSTEM FOR DIGITAL COMMUNICATION APPARATUS

BACKGROUND OF THE INVENTION

The present invention relates to a monitor system for use in a digital communication apparatus. In particular, it relates to a monitor system for use in a digital communication apparatus including a plurality of processing blocks, each processing digital data inputted thereto and thereby transmitting a result of the processing to the subsequent stage.

DESCRIPTION OF THE RELATED ART

In a communication apparatus for receiving digital data inputted from an external device and conducting operations such as multiplexing, separation or demultiplexing, and switching of the data, a monitor operation of the apparatus is commonly performed. Test data is inserted in an idle or unused band of the digital data to achieve the monitor operation in the apparatus.

Figure 1:
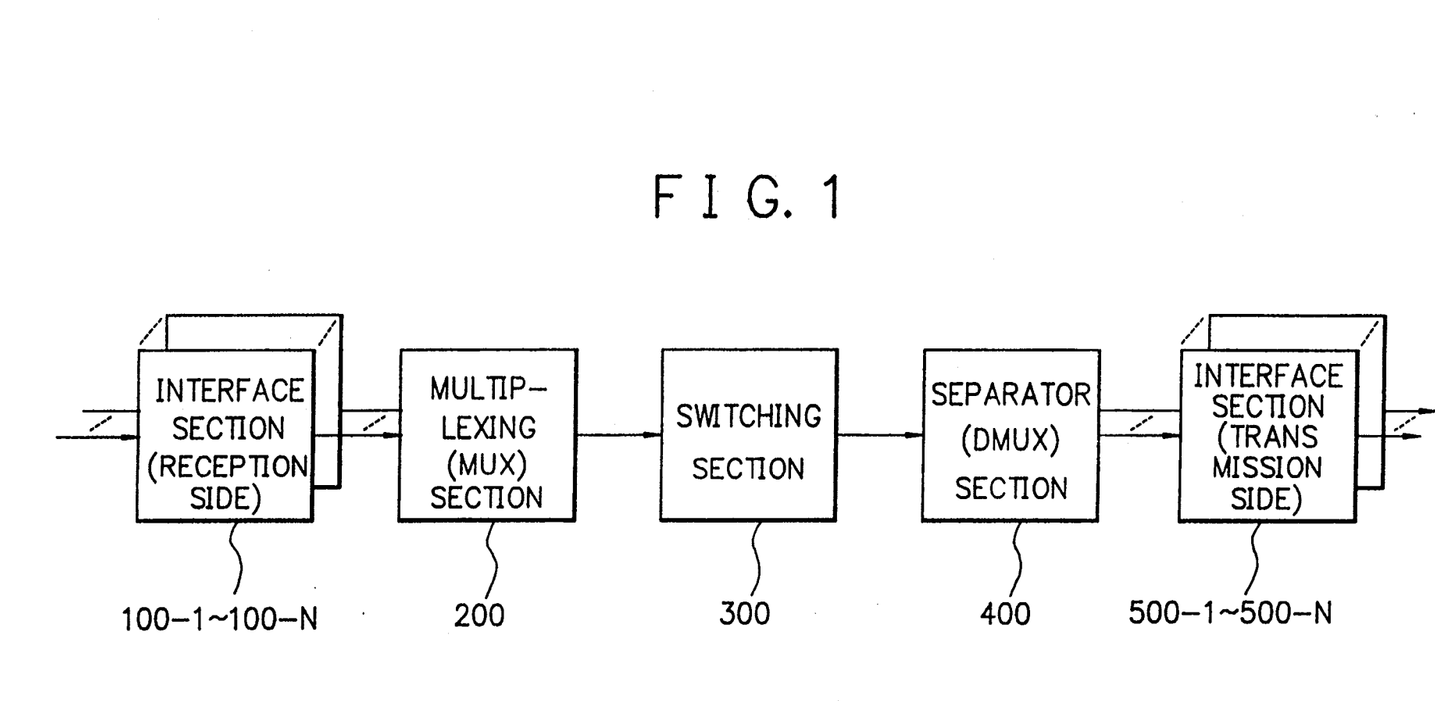
FIG. 1 is a schematic block diagram showing the configuration of a communication system to which the present invention is applied.

FIG. 1 is a block diagram of a generally utilized digital communication system. Interface sections 100-1 to 100-N receive a plurality of digital signals of a low-order group and then synchronize the respective digital signals with each other to output resultant signals to a multiplexer section 200. The multiplexer 200 multiplexes the signals delivered from the interface sections 100-1 to 100-N to send obtained signals to a switching section 300. Although the multiplexing section 200 is presented as a block in FIG. 1, there are actually disposed a plurality of multiplexer sections. The switching section 300 exchanges the order of the signals outputted from the respective multiplexer sections to achieve a data exchange operation and then transmits obtained signals to a separator or demultiplexer section 400. This section 400 separates signals of the low-order group from the received signals to deliver the separated signals to interface sections 500-1 to 500-N.

Figure 2:
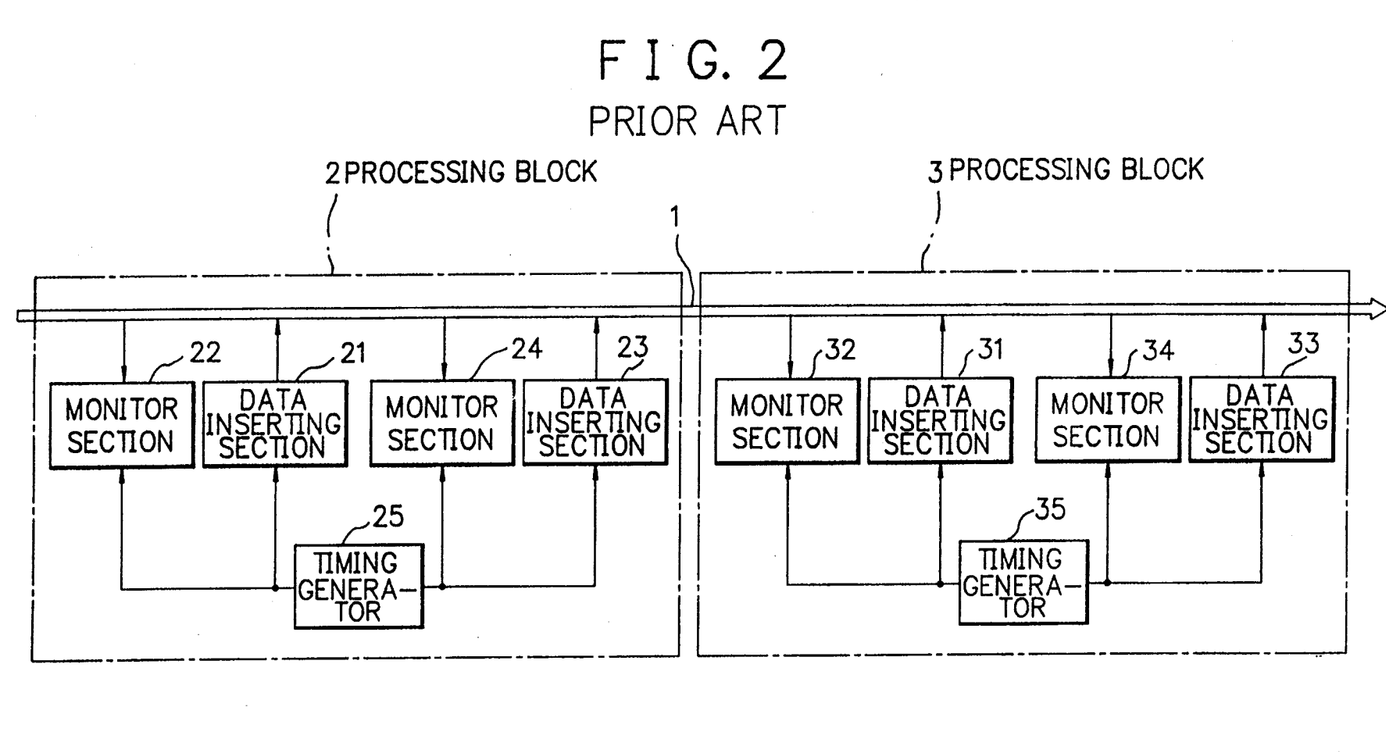
FIG. 2 is a block diagram showing a monitor system of a conventional digital communication apparatus.
Figure 3:
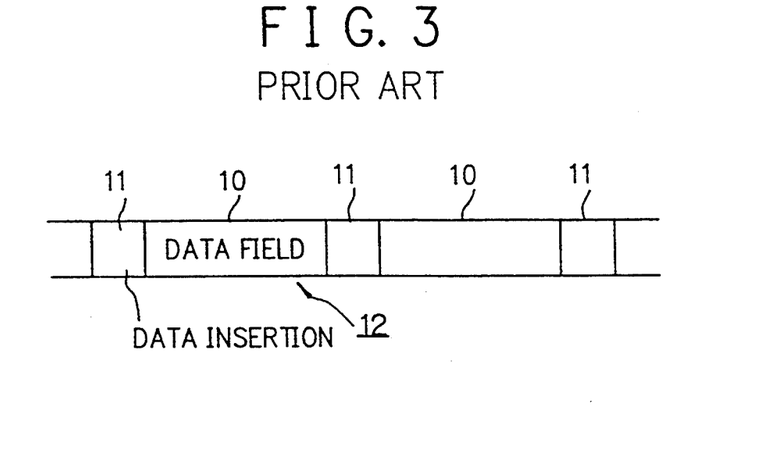
FIG. 3 is a diagram showing an example of the format of digital data in the prior art.
Figure 4:
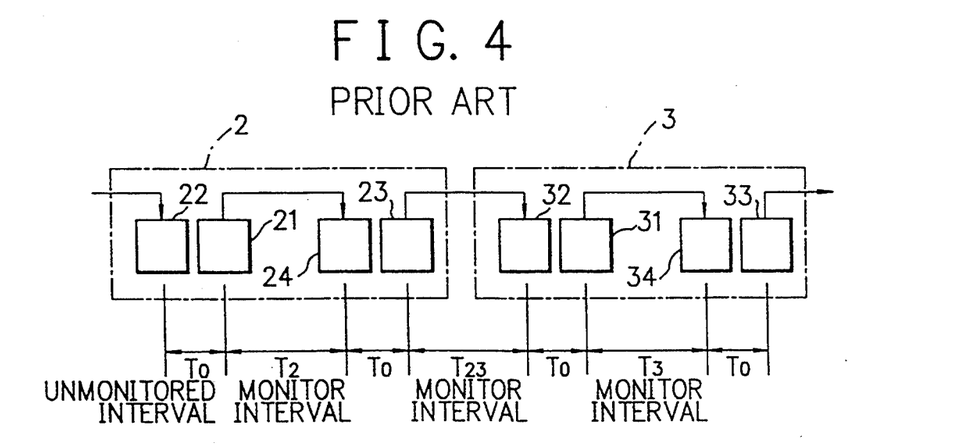
FIG. 4 is a schematic diagram showing monitor intervals in the conventional system.

Referring to FIGS. 2 to 4, description will be given of an example of the conventional monitor method to be applied to the system above. FIG. 2 is a block diagram schematically showing the make-up of the monitor system. There is arranged a cascade connection of a plurality of processing blocks 2 and 3 (two blocks are shown for simplification of explanation), each conducting signal processing on digital data 1 as the primary signal of this system.

Since the blocks 2 and 3 each have an identical structure, description will be given only for the block 2. A monitor section 22 between adjacent blocks receives digital data from a preceding stage (not shown). It extracts therefrom test data for a monitor operation between adjacent blocks inserted beforehand into a predetermined position of the data, thereby detecting any error thereof.

A test data inserting section 21 for monitor operation in a block inserts test data for the monitor operation in a block in a predetermined position of the received digital data. The test data is then extracted by a monitor section 24 for the monitor operation in a block to detect any error thereof.

An inserting section 23 inserts test data for monitor operation between adjacent blocks in a predetermined position of the digital data and then transmits the data to the block 3 in the succeeding stage 3.

A timing control section 25 determines timing of insertion or extraction of the test data for the sections 21 to 24.

FIGS. 2 to 4 show circuits disposed in the circuit configuration of FIG. 1. For example, the sections 21 to 24 of FIG. 2 are arranged respectively on an input side and an output side of the switching section 300.

FIG. 3 shows an example of the format of the digital data 12 containing test data. The format includes an effective band (data) field 10 of digital data and a test data insertion band field 11 for the monitor operation between adjacent blocks or in a block. The test data 11 is inserted in an unused area of data at a fixed interval.

FIG. 4 schematically shows monitor intervals in the system constitution of FIG. 2. The same components as those of FIG. 2 are assigned with the same reference numerals. Intervals T2 and T3 are assigned to the monitor operation in a block and an interval T23 is allocated to the monitor operation between adjacent blocks.

In an interval T0, there is not achieved any monitor operation. In the conventional system of FIG. 2, there exists such an unmonitored interval in each block as shown in FIG. 4. This accordingly leads to a drawback that failures cannot be recognized in these unmonitored intervals.

SUMMARY OF THE INVENTION

It is therefore an object of the present invention to provide a monitor system for a digital communication apparatus in which there does not exist any unmonitored interval in each processing block, so that the monitor operation of digital data is achieved in all the transmission intervals, thereby solving the problem of the prior art.

In accordance with the present invention, there is provided a monitor system in a digital communication apparatus including a plurality of processing blocks each processing input digital data and transmitting the data to a subsequent stage. It comprises test data inserting means for inserting, for each of the processing blocks, test data for a monitor operation in a block into the input digital data at a predetermined timing. Also included is data inserting means for inserting for each of the processing blocks, test data for a monitor operation between adjacent blocks into the input digital data at a predetermined timing. There is also monitor means for the monitor operation between blocks for extracting the test data sent from a previous stage for the monitor operation between adjacent blocks and monitoring an error thereof, and monitor means for the monitor operation in a block for extracting the test data in a block for the monitor operation in the block and monitoring an error thereof. Each of the means is arranged such that a monitor interval related to the test data for the monitor operation between adjacent blocks overlaps with a monitor interval associated with the test data for the monitor operation in a block.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the drawings, description will be given in detail of an embodiment in accordance with the present invention.

Figure 5:
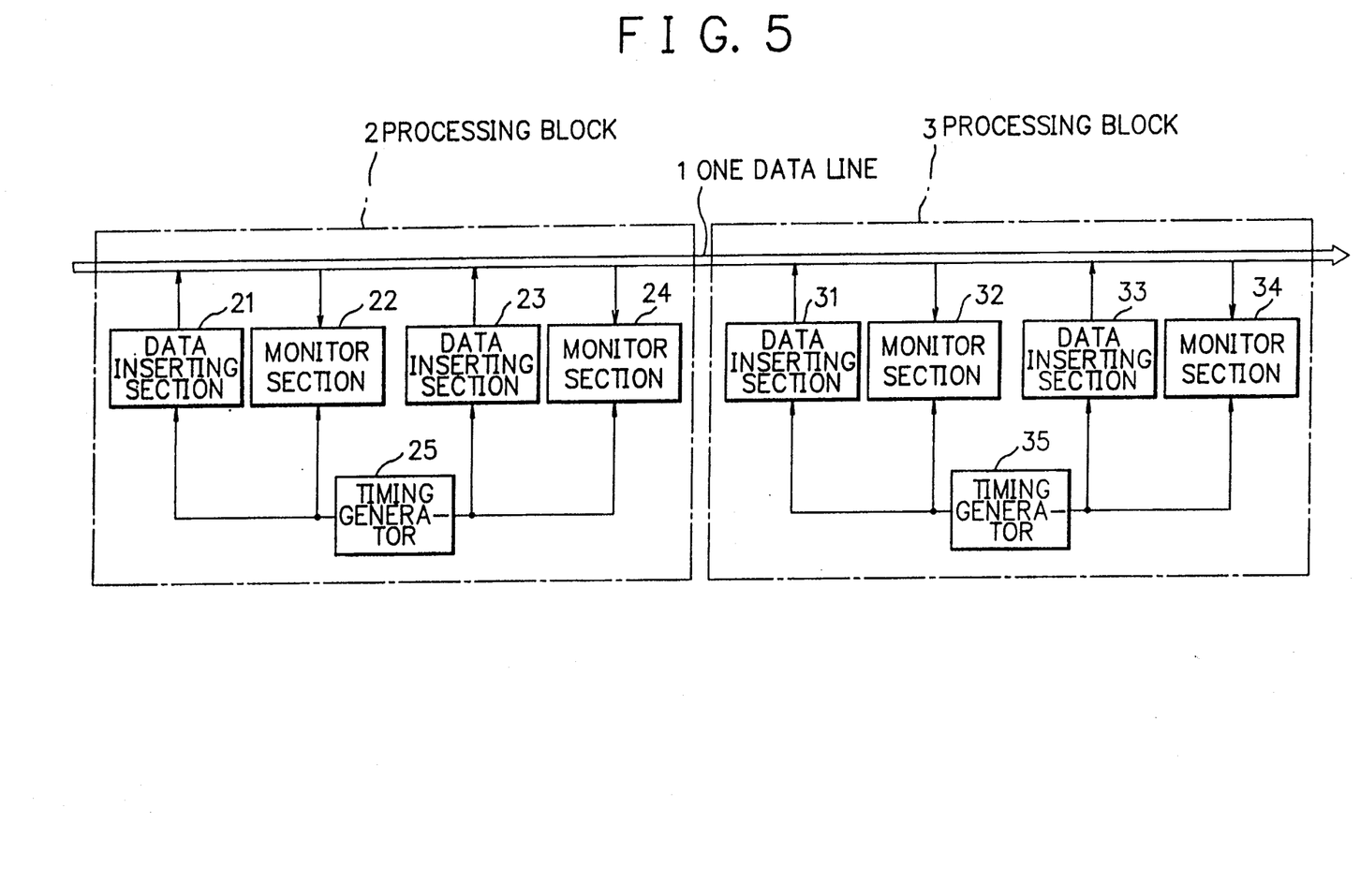
FIG. 5 is a block diagram illustratively showing an embodiment of a system in accordance with the present invention.

FIG. 5 is a system block diagram showing the structure of an embodiment in accordance with the present invention. In this configuration, the same constituent elements as those of FIG. 2 are assigned with the same reference numeral. The constitution is primarily differs from that of the prior art of FIG. 2 as follows. In the processing block 2 of FIG. 5, the positional relationships between the sections 21 and 22 and between the sections 23 and 24 of FIG. 2 are reversed. This is also the case in the block 3.

Figure 6:
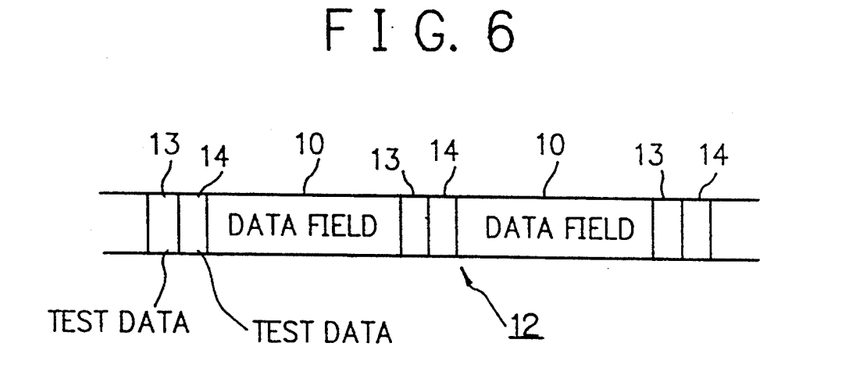
FIG. 6 is a diagram showing an example of the format of digital data adopted in the embodiment.

FIG. 6 shows an example of the format of the digital data 12 in this embodiment. The format includes an effective band field 10, a certain test data inserting band field 13 for the monitor operation in a block, and another test data inserting band field 14 for the monitor operation between adjacent blocks. These data items 13 and 14 are respectively inserted at fixed periods in idle or unused fields of data in the same manner as for the test data of the prior art. Insertion and extraction timings of the data items 13 and 14 are determined under control of timing control sections 25 and 35, respectively.

Figure 7:
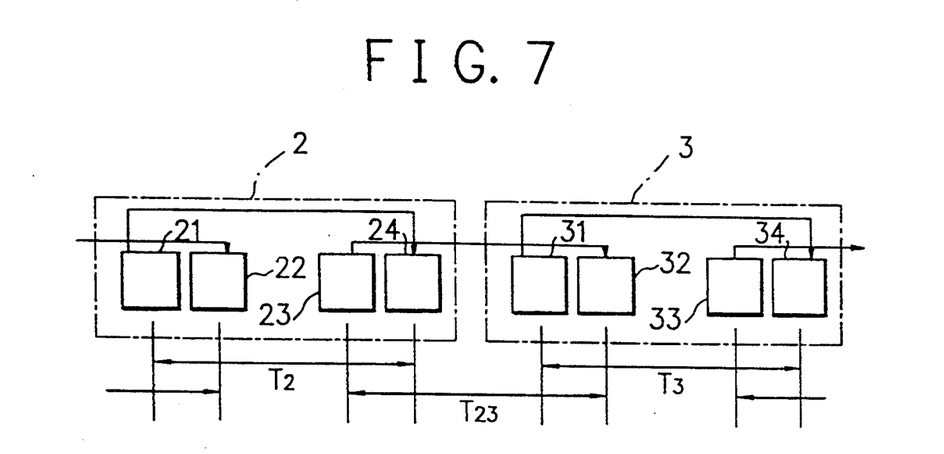
FIG. 7 is a diagram schematically showing monitor intervals in the system of FIG. 5.

FIG. 7 schematically shows monitor intervals in the system of FIG. 5. Monitor interval T2 comprises a test data inserting section 21 and a test data monitoring section 24, defining a first local section. Monitor interval T23 comprises a test data inserting section 23 and a test data monitoring section 32, defining a second local section. The same components as those of FIG. 5 are assigned with the same reference numerals. Monitor intervals T2 and T3 are respectively allocated to the monitor operation in a block, whereas a monitor interval T23 is assigned to the monitor operation in a block.

As above, the monitor sections and the test data inserting sections are arranged such that the monitor period of the monitor operation in a block overlaps with that of the monitor operation between adjacent blocks. As a result, there does not exist any unmonitored interval in any processing block.

Figure 8A:
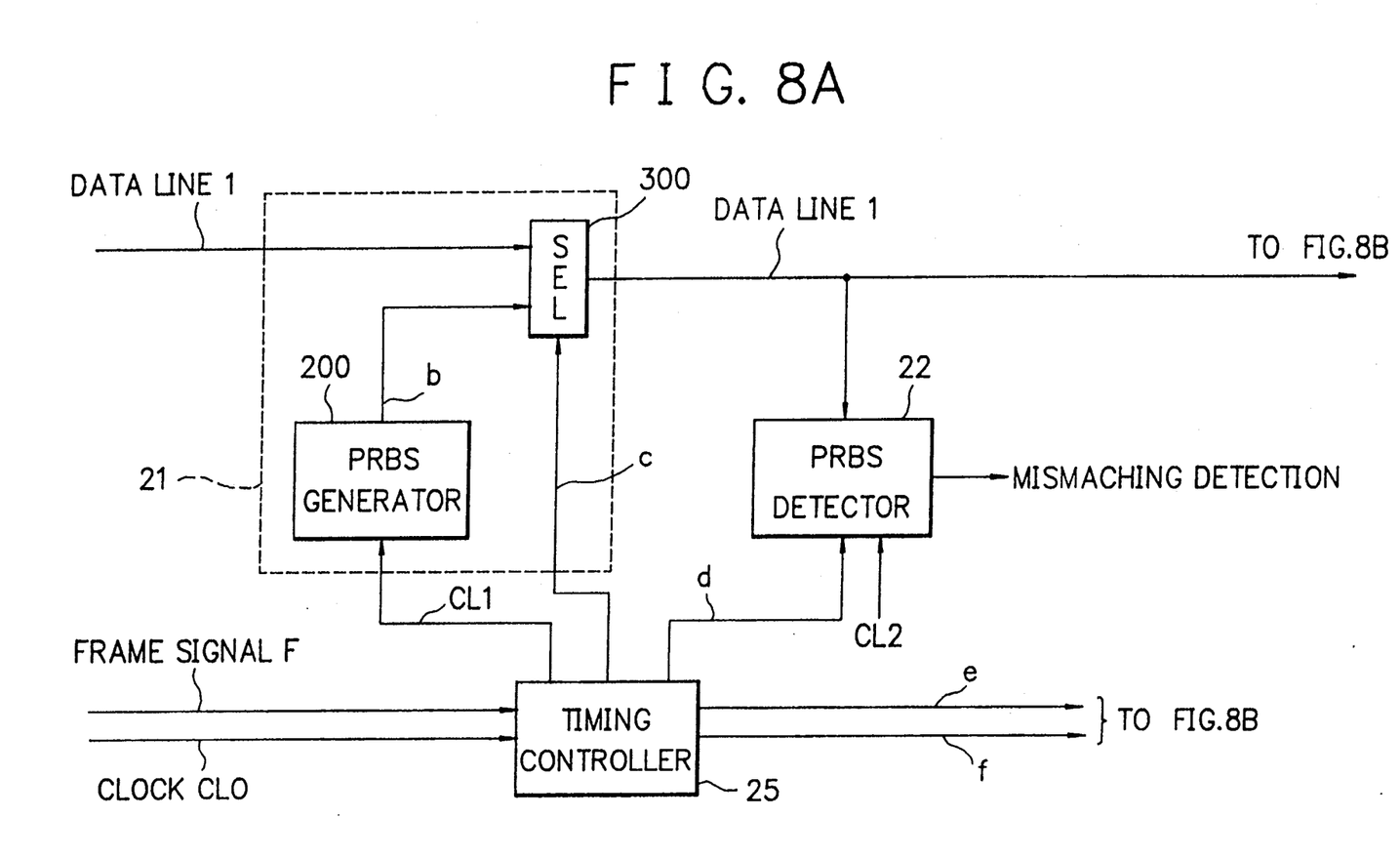
FIGS. 8A and 8B are diagrams showing the structure of each processing block of FIG. 4.
Figure 8B:
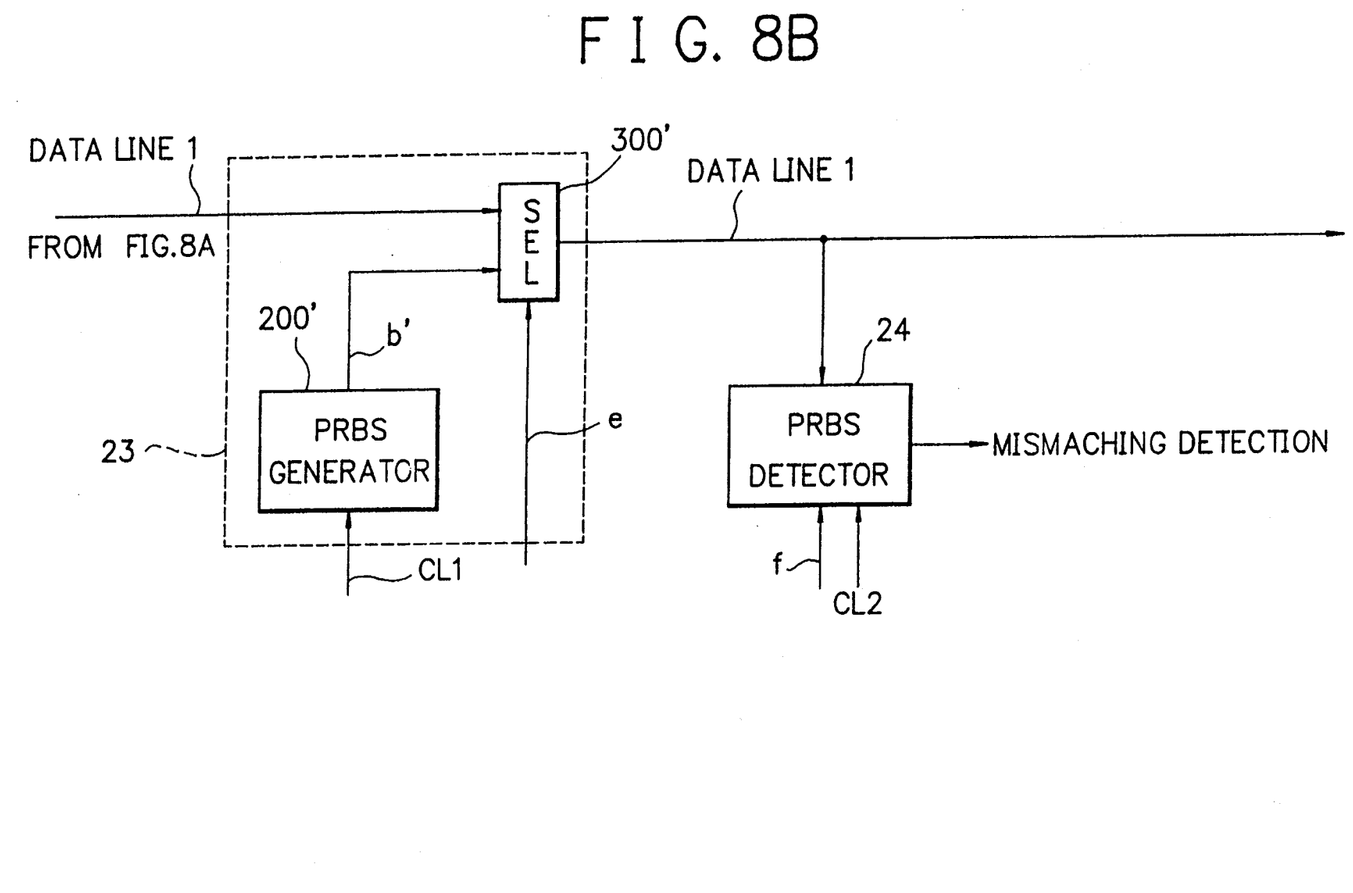

FIGS. 8A and 8B show the internal structure of the processing block 2 of FIG. 5 including a test data inserting section 21 for the monitor operation in a block, a test data monitoring section 22 for the monitor operation between blocks, a test data inserting section 23 for the monitor operation between blocks, and a test data monitoring section 24 for the monitor operation in a block.

Figure 9:
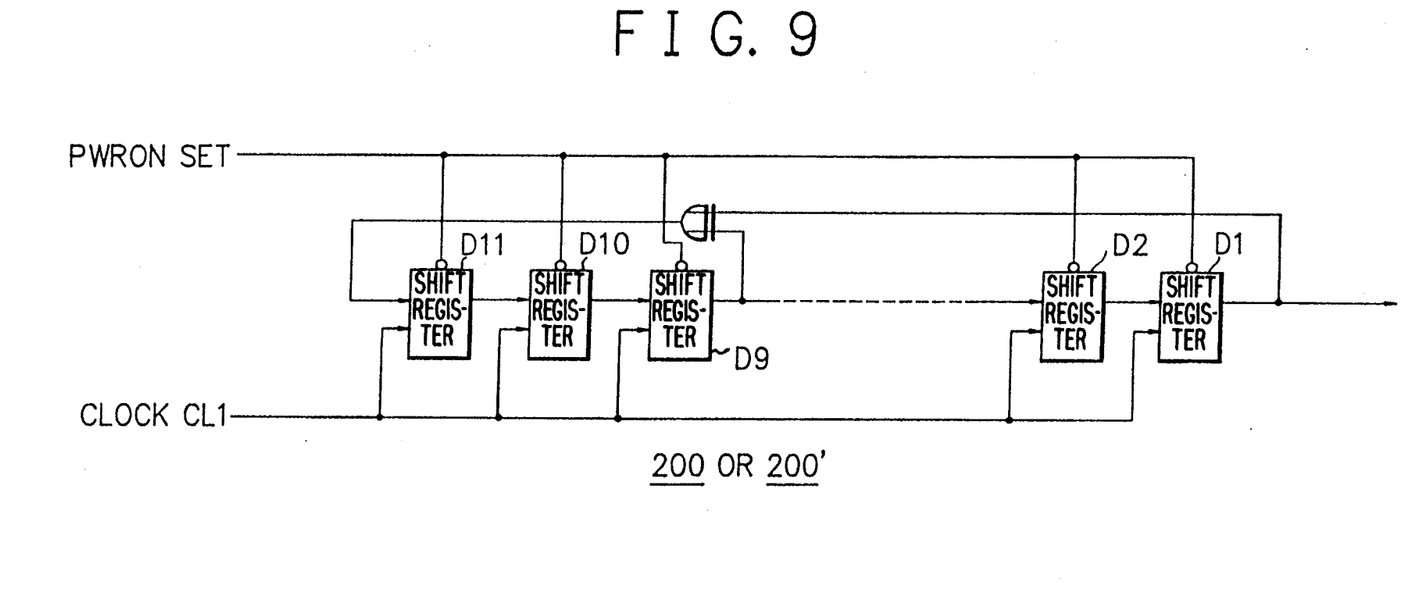
FIG. 9 is a diagram showing examples of a section for inserting test data for the monitor operation in a block and a section for inserting test data for the monitor operation between adjacent blocks.
Figure 10:
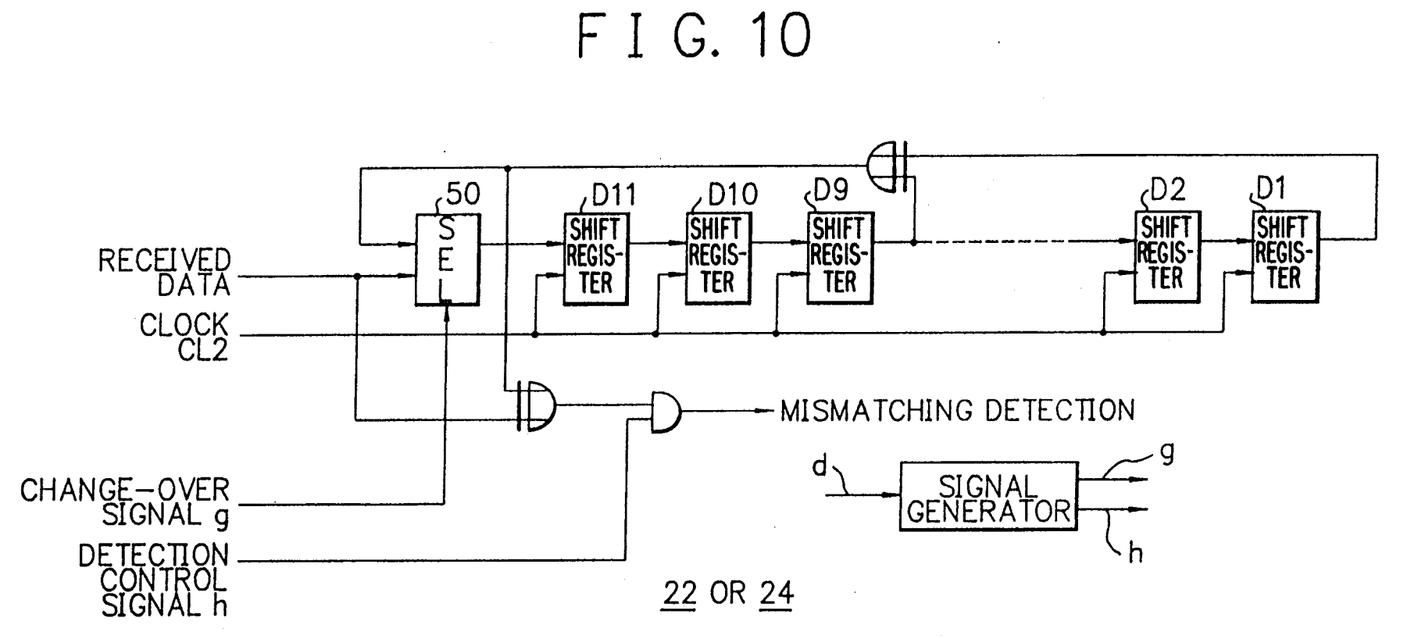
FIG. 10 is a diagram showing examples of a section for monitoring test data for the monitor operation in a block and a section for monitoring test data for the monitor operation between adjacent blocks.

The sections 21 and 23 are of an identical constitution. Each includes, for example, a PRBS generator circuit including shift registers constituted in 11 stages as shown in FIG. 9. Moreover, sections 22 and 24 have the same configuration. Each section is constituted with, for example, a PRBS detector circuit including shift registers constructed in 11 stages as shown in FIG. 10.

Figure 11:
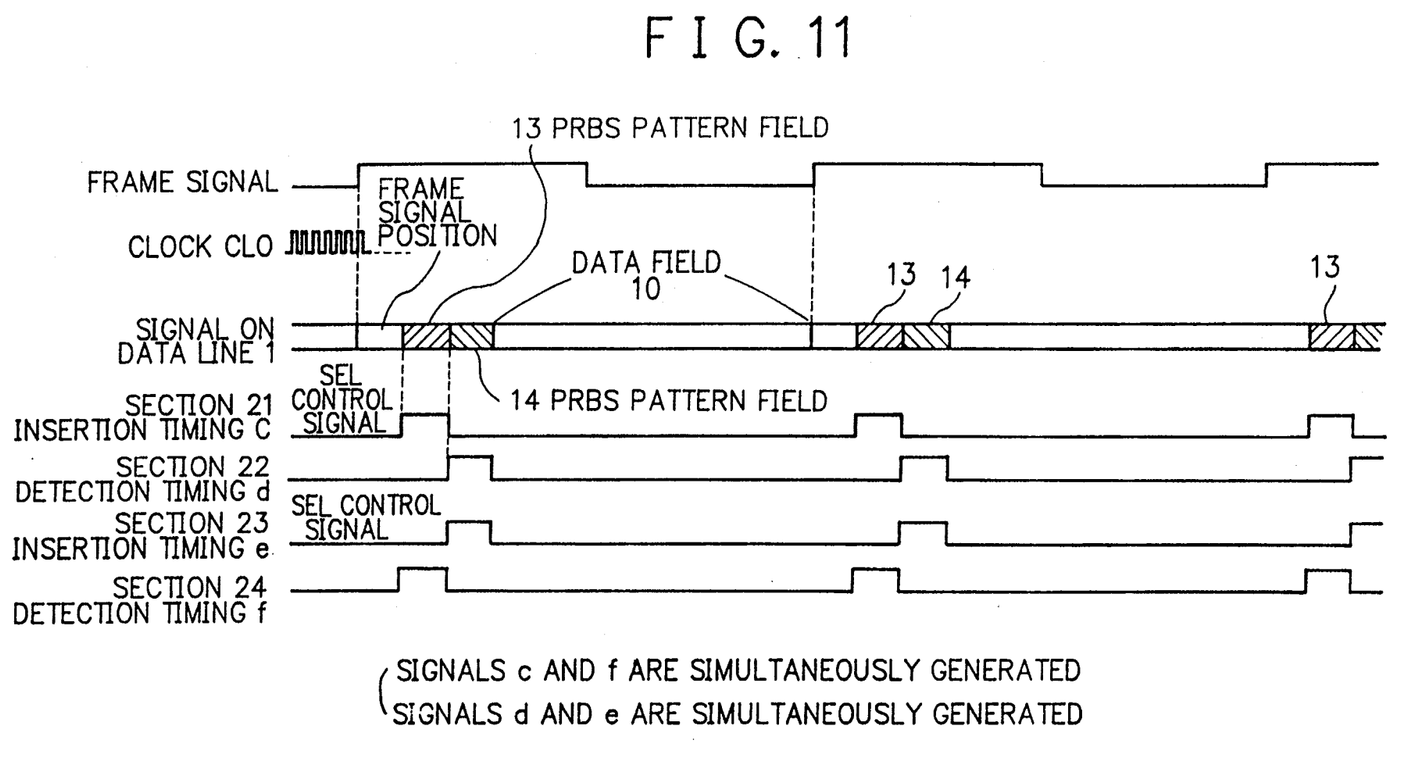
FIG. 11 is a signal timing chart showing control signals generated from a timing control section.

FIG. 11 shows control signals created from the timing controller 25 of FIG. 8A. In response to a change-over (insertion timing) signal c for a selector 200 in the section 21, a signal b from the PRBS generator 200 is inserted in a PRBS field 13 of the digital signal on data line 1.

The selector 300 selects the signal b when the change-over signal c is high. When the signal c is low, the selector 300 selects the digital data on the data line 1.

When the signal c is high, a detection timing signal f to the PRBS detector (test data monitoring section) 24 (FIG. 8B) is high. In response to the detection timing signal f, the PRBS detector 24 receives and detects the monitor test data inserted in the PRBS field 13 by the section 21.

In response to a detection timing signal d to the section 22, monitor test data inserted by a preceding block (not shown) in a PRBS field 14 is extracted from the PRBS field 14 of the digital signal 1, thereby achieving the monitor operation of the data by the PRBS detector.

When the detection timing signal d is high, insertion timing signal e is high. In response to the signal e, the selector 300' of the data inserting section 23 selects the signal b' from the PRBS generator 200'. Therefore, the PRBS data signal b' is inserted in the PRBS field 14. The inserted PRBS data signal b' is detected by the test data monitoring section 32 (FIG. 7).

Figure 12:
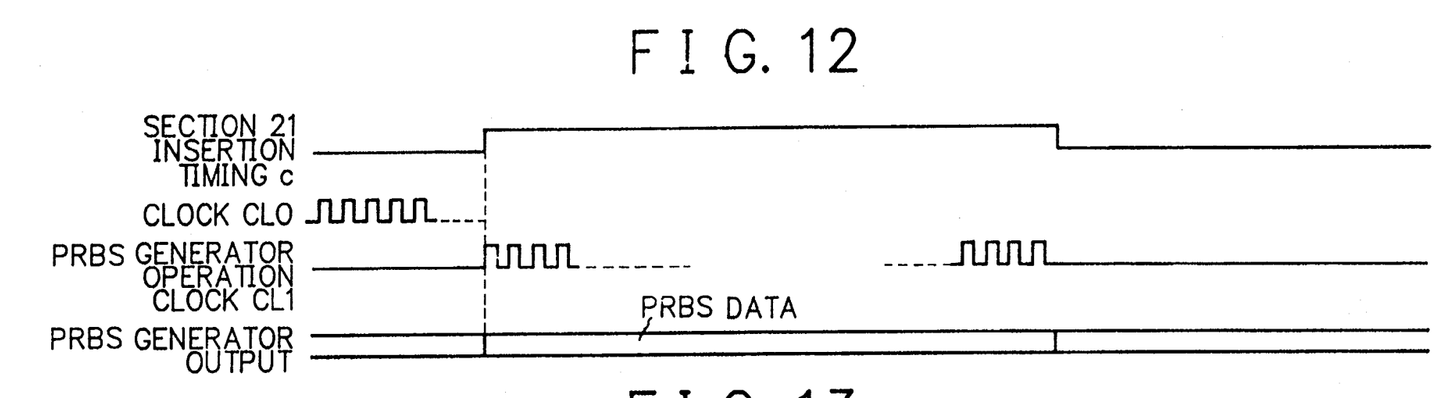
FIG. 12 is a signal timing chart showing the operation of a PRBS (Pseudo Random Binary Sequence) generating section.
Figure 13:
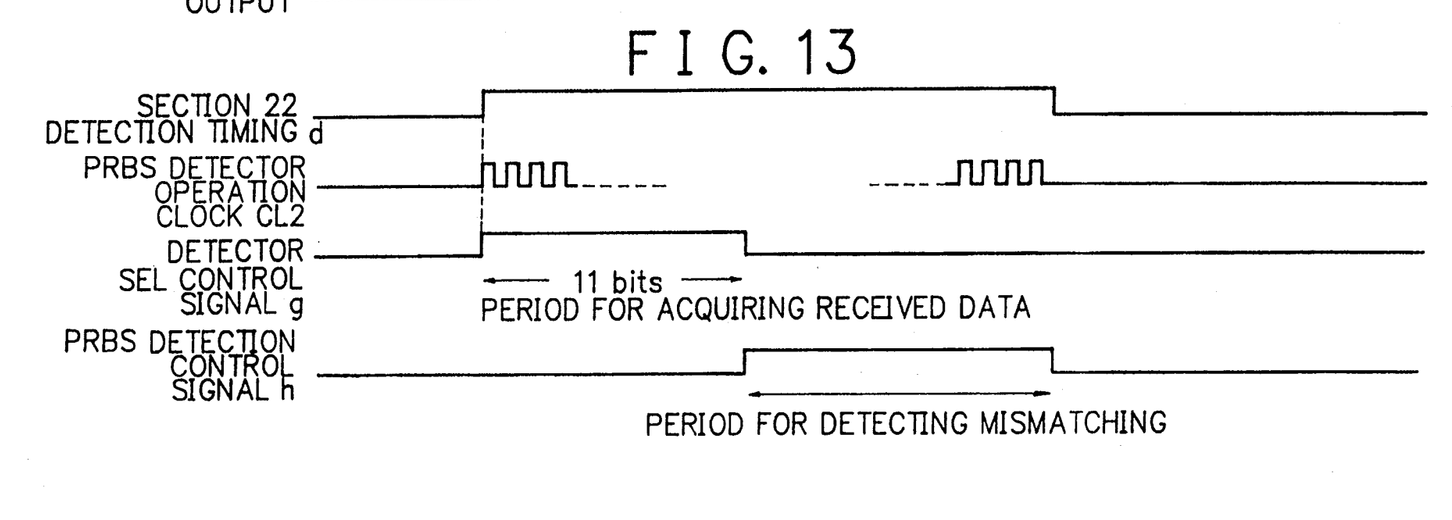
FIG. 13 is a signal timing chart showing the operation of a PRBS detecting section.

FIGS. 12 and 13 are diagrams for explaining in more detail the operations of the PRBS generator and detector. An operation clock signal CL1 for the PRBS generator 200 is produced as follows. Namely, a clock signal CL0 is gated by an insertion timing signal c of the section 21 to generate a thinned-out clock signal as the signal CL1. In response to the signal CL1, the operation of the PRBS generator 200 is performed to create a consecutive PRBS in each digital signal frame. Similarly, an operation clock signal CL2 for the PRBS detector 22 is generated by gating the clock signal CL0 by a detection timing signal d of the section 22. Moreover, in response to a signal g, the selector 50 of PRBS detector 22 (FIG. 2) is subjected to a change-over operation to store only 11 leading bits of the digital signal (received data) in shift registers D1 to D11. The selector 50 is again changed over at the timing of the 12th bit to activate the PRBS generating circuit, thereby conducting a mismatching detection on the digital signal. The detection period is associated with the 12th bit and the subsequent bits of the PRBS field. Detection of a mismatching indicates that a failure has occurred during the monitor interval.

FIGS. 12 and 18 respectively show an insertion timing of an PRBS in the section 21 and a detection timing of the PRBS (test data for the monitor operation between adjacent blocks) in the section 22. The PRBS inserted in the data line at the insertion timing in the section 28 is detected at a detection timing in the section 32 of the subsequent stage. The PRBS inserted at the PRBS insertion timing in the section 21 is detected at a detection timing in the section 24.

In this regard, according to the embodiment, although the clock signals CL1 and CL2 are produced from the timing controller 25, it may also possible that the PRBS generator creates the clock signal CL1 from the clock signal CL0 and the insertion timing signal c (or e) of the section 21 and the PRBS detector generates the clock signal CL2 from the clock signal CL0 and the detection timing signal d (or f) of the section 22. Moreover, the same PRBS is employed in the sections 21 and 23; however, different PRBS may be adopted respectively in these sections.

In this embodiment, the clock signal CL0 is the basic clock signal of data of the system and the frame signal F is a signal generated by synchronizing the data signal with respect to a frame synchronizing position.

As above, in accordance with the present invention, the monitor sections and the test data inserting sections are arranged such that the period of the monitor operation in a block overlaps with that of the monitor operation between adjacent blocks, thereby conducting the monitor operations respectively in a block and between blocks in an independent fashion. As a result, there does not exist any unmonitored interval in each processing block and hence the monitor operation can be continuously accomplished in all transmission intervals.

While the present invention has been described with reference to the particular illustrative embodiment, it is not to be restricted by those embodiment but only by the appended claims. It is to be appreciated that those skilled in the art can change or modify the embodiment without departing from the scope and spirit of the present invention.

What is claimed is:

1. A monitor system for monitoring each of a plurality of continuous operation cycles in a digital communication system comprising a data processing line having a first local section thereof defined by a first local position and a second local position thereon, to process a set of processible data inputted thereto from said data processing line at said first local position, and to output a set of processed data to said data processing line at said second local position, wherein said set of processible data and said set of processed data are formatted in a predetermined combination of data fields in one of said operation cycles, comprising:

a first inserting means for inserting a first test data for testing said first local section for a local defect therein, into a certain one of said data fields, at said first local position;

a second inserting means for inserting a second test data for testing a second local section of said data processing line defined by a third local position and a fourth local position thereon for another local defect therein, into another one of said data fields, at said third local position;

a first monitoring means for monitoring said first test data, as it is processed through said first local section, by extracting first test data from said certain one of said data fields at said second local position; and a second monitoring means for monitoring said second test data, as it is subjected to a processing action of said second local section, by extracting said second test data from said another one of said data fields at said fourth local position;

said first local section and said second local section of said data processing line partially overlap with each other; and said certain one and said another one of said data fields being separate from each other, so that no interference occurs between said first test data and said second test data.

2. A monitor system as claimed in claim 1, wherein the first inserting means inserts the first test data responsive to a first insertion timing signal, the second inserting means inserts the second test data responsive to a second insertion timing signal, the first monitoring means extracts the first test data responsive to a first detection timing signal, and the second monitoring means extracts the second test data responsive to a second detection timing signal.

3. A monitoring method for monitoring each of a plurality of continuous operation cycles preset therefor, a digital communication system-comprising a data processing line having a first local section thereof defined by a first local position and a second local position thereon, for processing a set of processible data inputted thereto from said data processing line at said first local position, and outputting a set of processed data to said data processing line at said second local position, wherein said set of processible data and said set of processed data are formatted in a predetermined combination of data fields in one of said operation cycles, during said each of said plurality of operation cycles, comprising the steps of:

inserting a first test data for testing said first local section for a local defect therein, into a certain one of said data fields, at said first local position;

inserting a second test data for testing a second local section of said data processing line for another local defect therein, said second local section being defined by a third local position on said data processing line located between said first local position and said second local position, and a fourth local position on said data processing line located on an opposite side of said third local position with respect to said second local position, into another one of said data fields separated from said certain one thereof, at said third local position;

monitoring said first test data, as it is processed through said first local section, by extracting first test data from said certain one of said data fields at said second local position; and monitoring said second test data as it is subjected to a processing action of said second local section, by extracting said second test data from said another one of said data fields at said fourth local position.

4. A method as claimed in claim 3, wherein the first test data is inserted responsive to a first insertion timing signal, the second test data is inserted responsive to a second insertion timing signal, the first test data is extracted responsive to a first detection timing signal, and the second test data is extracted responsive to a signal detection timing signal.

5. A monitor system as claimed in claim 2, wherein the first insertion timing signal and the second detection timing signal are generated substantially simultaneously, and the second insertion timing signal and the first detection timing signal are then generated substantially simultaneously.

6. A monitor system as claimed in claim 2, further comprising a timing controller generating the timing signals to the first and second inserting means and the first and second monitoring means.

7. A monitor system as claimed in claim 6, wherein the timing controller generates the timing signals responsive to a frame signal and a clock signal.

8. A monitor system as claimed in claim 2, further comprising a data processing line connected to the first and second inserting means and first and second monitoring means.

9. A monitor system as claimed in claim 2, wherein the first and second monitoring means detect a mismatch on the test data, and generate a mismatching detection signal responsive thereto.

10. A method as claimed in claim 4, further comprising:
(f) generating the first insertion timing signal and the second detection timing signal substantially simultaneously; and
(g) generating the second insertion timing signal and the first detection timing signal substantially simultaneously.

11. A method as claimed in claim 4, further comprising the step of generating the timing signals from a timing controller.

12. A method as claimed in claim 11, wherein the timing signal generating step is responsive to a frame signal and a clock signal.

13. A method as claimed in claim 4, further comprising the step of transmitting the input digital data processing on a data line.

14. A method as claimed in claim 4, further comprising the step of detecting a mismatch on the test data, and generating a mismatching detection signal responsive thereto.

* * * * *

UNITED STATES PATENT AND TRADEMARK OFFICE
CERTIFICATE OF CORRECTION

PATENT NO.   : 5,450,440
DATED        : September 12, 1995
INVENTOR(S)  : NISHIHARA et al.

It is certified that error appears in the above-indentified patent and that said Letters Patent is hereby corrected as shown below:

On the Title page, item [73] should read:
--NEC Corporation, Tokyo, Japan and Nippon Telegraph and Telephone Corporation, Tokyo, Japan--.

Signed and Sealed this

Twenty-ninth Day of October 1996

*Attest:*

BRUCE LEHMAN

*Attesting Officer*     *Commissioner of Patents and Trademarks*